(12) United States Patent
Nishimura et al.

(10) Patent No.: US 7,474,855 B2
(45) Date of Patent: Jan. 6, 2009

(54) INFORMATION SUPPORT SYSTEM

(75) Inventors: Takuichi Nishimura, Tokyo (JP);
Yoshiyuki Nakamura, Tokyo (JP);
Hideo Itoh, Tokyo (JP); Hideyuki Nakashima, Tokyo (JP); Takeshi Kurata, Tsukuba (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 572 days.

(21) Appl. No.: 10/536,364

(22) PCT Filed: Nov. 26, 2003

(86) PCT No.: PCT/JP03/15064

§ 371 (c)(1),
(2), (4) Date: Jan. 9, 2006

(87) PCT Pub. No.: WO2004/049603

PCT Pub. Date: Jun. 10, 2004

(65) Prior Publication Data
US 2006/0153571 A1    Jul. 13, 2006

(30) Foreign Application Priority Data
Nov. 27, 2002   (JP)   ............................. 2002-344724
Mar. 24, 2003   (JP)   ............................. 2003-081513

(51) Int. Cl.
*H04B 10/00*   (2006.01)
(52) U.S. Cl. ..................... 398/118; 398/127; 398/128; 398/130; 398/140
(58) Field of Classification Search ................ 398/118, 398/127, 128, 130, 135, 138, 140
See application file for complete search history.

(56) References Cited

U.S. PATENT DOCUMENTS

| | | | | |
|---|---|---|---|---|
| 4,977,619 | A | * | 12/1990 | Crimmins ..................... 398/96 |
| 5,495,357 | A | * | 2/1996 | Osterhout .................... 398/107 |
| 2005/0031351 | A1 | * | 2/2005 | Nishimura et al. .......... 398/135 |

FOREIGN PATENT DOCUMENTS

JP        08-097777        4/1996

(Continued)

OTHER PUBLICATIONS

Takuichi Nishimura et al., "A Compact Battery-maintenance-free Information Terminal (CoBIT) for Location-based Support Systems", Information Processing Society of Japan Kenkyu Hokoku, Human Interface (HI) 97-17, Onsei Gengo Joho Shori (SLP) 40-17, Feb. 2, 2002, pp. 97-102.

*Primary Examiner*—M. R. Sedighian
(74) *Attorney, Agent, or Firm*—Wenderoth, Lind & Ponack, L.L.P.

(57) ABSTRACT

A battery-less terminal (1) has means (21) for photoelectrically converting an optical signal from an information transmission device (2), means (12) for outputting the electric signal generated by the photoelectric conversion means (21) as sound, means (13) for reflecting infrared light for position emitted by a position detection device (3), a light source (14) for infrared light for ID, means (15) for storing ID data, and means (16) for modulating the infrared light for ID in accordance with the ID data. The information transmission device (2) has a light source (21) for an optical signal and means (22) for modulating the strength of the optical signal in accordance with the electric signals of sound information. The position detection device (3) has a light source (31) for the infrared light for position, means (32) for imaging the infrared light for position reflected by the battery-less terminal (1), and means (33) for detecting the position of the battery-less terminal (1) based on the infrared image by the infrared imaging means (32). An ID detection device (4) has an infrared sensor (41) receiving infrared light for ID from the battery-less terminal (1) and outputting ID data.

9 Claims, 12 Drawing Sheets

FOREIGN PATENT DOCUMENTS

| | | |
|---|---|---|
| JP | 2000-214945 | 8/2000 |
| WO | 03/047131 | 6/2003 |

\* cited by examiner (a)

(b)

(c)

INFORMATION SUPPORT SYSTEM

TECHNICAL FIELD

The invention of this application relates to an information support system. More particularly, the invention of this application relates to a new information support system providing separate information support to multiple users in optical space communication.

BACKGROUND ART

In recent years, realization of a ubiquitous information environment where information can be accessed "at anytime and anywhere, and by anyone" has been often proposed. To meet this need, the present inventors of the invention of this application have already proposed an information support system allowing a user to obtain information from an information transmission device provided at any position in the surrounding environment simply by placing his/her user terminal at a proper position and in a proper direction. The user terminal therein is a simple, small and light terminal which needs no battery, and this good mobility and attachability of the battery-less terminal allowing easy information access (see Nonpatent Documents 1 to 3 and Patent Document 1, for example).

Further describing the information support system, as shown in FIG. 9, for example, the battery-less terminal (1), carried by or attached to a user, has a photoelectric conversion means (11) such as a solar cell for receiving an optical signal which is strength-modulated and emitted by an information transmission device (2) and converting the optical signal to an electric signal and also has a sound output means (12) such as an earphone and a head phone for outputting the electric signal converted by the photoelectric conversion means (11) as sound. The information transmission device (2) placed in the environment side has a light source (21) of the optical signal and a modulation means (22) for modulating the strength of the optical signal in accordance with an electric signal of sound information to be transmitted. This system achieves ubiquitous information support wherein a user can freely acquire and listen to his/her necessary sound information by simply directing his/her own battery-less terminal (1) toward the information transmission device (2). In the battery-less terminal (1), the sound output means (12) is driven by the electric signal obtained by the photoelectric conversion means (11) and the electric signal is directly replayed as sound. The alternating current component which an information signal is assigned to is used for driving the sound output means (12) and the direct current component generated simultaneously by the photoelectric conversion means (11) is not used. Thus, sound output is implemented with no battery, entirely by the alternating current component.

Furthermore, as exemplified in FIG. 10, in order to allow the detection of the position of a user, the information support system further provides a position detection device (3) which uses an infrared imaging in the environment side. The battery-less terminal (1) further has a reflection means (13) such as a retroreflector for reflecting infrared light emitted by the position detection device (3). And, the position detection device (3) is provided with an infrared light source (31) of infrared light, an infrared imaging means (32) for detecting infrared light reflected and returned by the battery-less terminal (1) and a position detection means (33) for detecting the position of the battery-less terminal (1) based on an infrared image captured by the infrared imaging means (32). Thus, this system achieves interactive information support wherein the user can obtain sound information and at the same time the environment side can obtain user position information.

FIG. 11 is a schematic and external view of a more specific example of the above information support system. In this example, the battery-less terminal (1) is an earphone type terminal integrally equipped with a solar cell (11A) serving as the photoelectric conversion means (11), an earphone (12a) serving as the sound output means (12) and a retroreflective sheet (13a) serving as the reflection means (13). More specifically, a plate-like light transmitting/receiving portion comprising the retroreflective sheet (13a) around the solar cell (11a), the two substantially on one plane, is attached to an ear attachment portion having the earphone (12a). And, the plate-like light transmitting/receiving portion and the ear attachment portion are unified into one terminal body so that the photo-receptive plane or the solar cell (11a) and the photo-reflective plane of the retroreflective sheet (13a) face in the direction of user's line of sight when the earphone (12a) is attached to a user's ear. Inside the terminal, there is only a wire (not shown) for connecting the output terminal of the solar cell (11a) and the input terminal of the earphone (12a), and no power supply such as a battery for driving the earphone (12a) is installed therein. This is because the earphone (12a) is directly driven by an electric signal obtained by the solar cell (11a) to output the sound as described above and does not require any other power supply. The earphone type battery-less terminal (1) can in this way achieve more superior terminal attachability, and a user who is a terminal user can obtain information support from the environment side more easily.

On the other hand, the information transmission device (2) in the environment side is equipped with an LED (21a) serving as the light source (21) of optical signals and also equipped with a modulator circuit (22a) serving as the modulation means (22), which is installed inside the device cabinet or externally and separately of the device. The modulator circuit (22a) performs the strength modulation of the optical signal by, for example, changing the driving voltage of the LED (21a) in accordance with the voltage level of a sound signal generated by a sound source (not shown), which is a source of sound information to be transmitted. The LED (21a), for example, may be an infrared LED which can emit a sufficient amount of light or may include an array of LEDs in order to obtain more amount of light for a required transmission distance. In accordance with the purpose of use, the LED (21a) preferably has directivity such that the light can be emitted only in a specific direction and may include an LED array at the focus position of a reflection mirror having a parabola reflective plane, for example.

The position detection device (3) is integrally equipped with an infrared LED (31a) serving as the infrared light source (31) and an infrared camera (32a) serving as the infrared imaging means (32), and further equipped with a position detector (33a) serving as the position detection means (33), which is installed inside the device cabinet or externally and separately of the device. Since the retroreflective sheet (13a) of the battery-less terminal (1) reflects received light parallel to the incident direction, the infrared camera (32a) and the infrared LED (31a) are disposed close to each other in the integrated position detection means (33) in order to capture the reflected and returned infrared light accurately.

Then, as illustrated in FIG. 12, when a user wearing the earphone type battery-less terminal (1) in his/her ear enters into the environment where the information transmission device (2) and the position detection device (3) are prepared and directs him/herself toward those environment-side devices, the user can listen to various sound information such as voice, music and sound signals and also can inform his/her position to the environment side. FIG. 12 illustrates an application example in an art museum, where a user can hear voice guide information on each picture.

As described above, the information support system already proposed by the inventors of the present invention realizes the information support with significantly superior characteristics of ubiquitous and interactivity.

[Nonpatent Document 1] Takuichi NISHIMURA et al, "Interactive Joho Shien notameno Mudengen Kogata Joho Tanmatsu (Compact Battery-less Information Terminal for Interactive Information Support)", Shingakugiho, The Institute of Electronics, Information and Communication Engineers, Nov. 22, 2002, pgs. 1 to 6.

[Nonpatent Document 2] Takashi NAKAMURA et al, "Mudengen Kogata Tsushin Tanmatsu CoBIT niyoru Kinkyori Joho Shien no Jitsugen (Realization of Short Distance Information Support with Compact Battery-less Information Terminal CoBIT)", Report of Information Processing Society of Japan Study Group, Information Processing Society of Japan, Jun. 8, 2002, 2002-ICII-3, pgs. 1 to 7.

[Nonpatent Document 3] Takuichi NISHIMURA et al, "Mudengen Kogata Tsushin Tanmatsu wo Mochiita Ichini Motozuku Joho Shien Sisutemu (Information Support System based on Position with Compact Battery-less Information Terminal)", Report of Information Processing Society of Japan Study Group, Information Processing Society of Japan, Jan. 28, 2002, 2002-ICII-2, pgs. 1 to 6.

[Patent Document 1] PCT/JP02/12306

DISCLOSURE OF THE INVENTION

However, with the information support system as described above, all users hear the same sound information transmitted from the information transmission device (2) in the environment side, and the sound information is not addressed to each user separately. In other words, separate information support for each user has not been realized yet.

For example, in an art museum, a museum or an exhibition where the information support system is installed, the information transmission device (2) is disposed near an exhibit and any visitor with the battery-less terminal (1) standing in front of the exhibit in a signal transmission range of the information transmission device (2) (see FIG. 12, for example), hears the same voice information. However, the information required or preferred by each visitor is naturally different. For example, a Japanese visitor may require information in Japanese, and a foreigner may require information in his/her own national language. Alternatively, an elementary school student may prefer information in simple words but a junior-high or high school student may prefer information in the language at an educated person's language level. Therefore, there is a demand for information support separately addressing each user.

Accordingly, in view of these issues, it is an object of the invention of this application to provide a new information support system which can realize separate information support for each user by improving the above information support system.

In order to achieve the above object, the invention of this application provides, as illustrated in the functional block diagram of FIG. 1, an information support system characterized by comprising an information transmission device (2) for transmitting sound information to a battery-less terminal (1), a position detection device (3) for detecting position information of the battery-less terminal (1) and an ID detection device (4) for detecting ID information of the battery-less terminal (1), wherein the battery-less terminal (1) has a photoelectric conversion means (21) for receiving and converting an optical signal which is strength-modulated and transmitted by the information transmission device (2) to an electric signal, a sound output means (12) for outputting the electric signal converted by the photoelectric conversion means (21) as sound, a reflection means (13) for reflecting infrared light for position emitted by the position detection device (3), an infrared light source (14) of infrared light for ID, an ID memory means (15) for memorizing ID data, and a modulation means (16) for modulating infrared light for ID in accordance with ID data, the information transmission device (2) has a light source (21) of an optical signal and a modulation means (22) for modulating the strength of the optical signal in accordance with the electric signal of the sound information to be transmitted, the position detection device (3) has an infrared light source (31) of infrared light for positioning, an infrared imaging means (32) for capturing infrared light for positioning which is reflected and returned by the battery-less terminal (1), and a position detection means (33) for detecting the position of the battery-less terminal (1) based on the infrared image captured by the infrared imaging means (32), and the ID detection device (4) has an infrared sensor (41) for receiving the infrared light for ID which is modulated and emitted by the battery-less terminal (1) and outputting ID data.

The invention of this application secondly provides the information support system characterized in that the infrared imaging means (32) of the position detection device (3) further captures the infrared light for ID modulated and emitted by the battery-less terminal (1), and the position detection means (33) of the position detection device (3) further detects the position of the battery-less terminal (1) based on the infrared image for ID captured by the infrared imaging means (32). The invention of this application thirdly provides the information support system characterized in that the infrared light source (14) of the battery-less terminal (1) emits infrared light for ID intermittently. The invention of this application fourthly provides the information support system characterized in that the time intervals of the intermittent light emission are random. The invention of this application fifthly provides the information support system characterized in that the infrared light source (14) of the battery-less terminal (1) emits different infrared light for imaging after a predetermined period of time following the emission of the infrared light for ID. The invention of this application sixthly provides the terminal detection system characterized in that the infrared light source (14) of the battery-less terminal (1) emits the infrared light for imaging with a predetermined time gap immediately before, or after, or before and after the emission of the infrared light for ID. The invention of this application seventhly provides the information support system characterized by further comprising a light transmittance changing means on a reflected light path by the reflection means (2) of the battery-less terminal (1), wherein the change in the light transmittance by the light transmittance changing means is synchronized with the emission of the infrared light for ID by the infrared light source (14). The invention of this application eighthly provides the information support system characterized in that the information transmission device (2) further has a sound information database (23) storing sound information corresponding to predetermined ID data, and a sound information selection means (24) for selecting from the sound information database the sound information corresponding to the ID data outputted from the infrared sensor (41) of the ID detection device (4), wherein an optical signal whose strength is modulated in accordance with an electric signal of sound information selected by the sound information selection means (24) is transmitted. And, the invention of this applicaion ninthly provides the information support system characterized in that the information transmission device (2) further has a transmission direction control means (25) for directing the emission of an optical signal toward the position of the battery-less terminal (1) detected by the position detection means (33) of the position detection device (3).

According to the invention of this application characterized as above, in the environment side, there is provided the ID detection device (4) in addition to the information transmission device (2) and position detection device (3), and in the user side, there are emitted his/her ID information from the battery-less terminal (1) by infrared light, thus the position information and ID information of the user terminal can be detected at the same time. Consequently, the information support is provided separately to each user based on the position information and ID information. For example, when a user is at a certain position, sound information in his/her native language can be transmitted only to that user at that position if information regarding his/her native language is included in the ID information of that user.

BEST MODE FOR CARRYING OUT THE INVENTION

Figure 2:
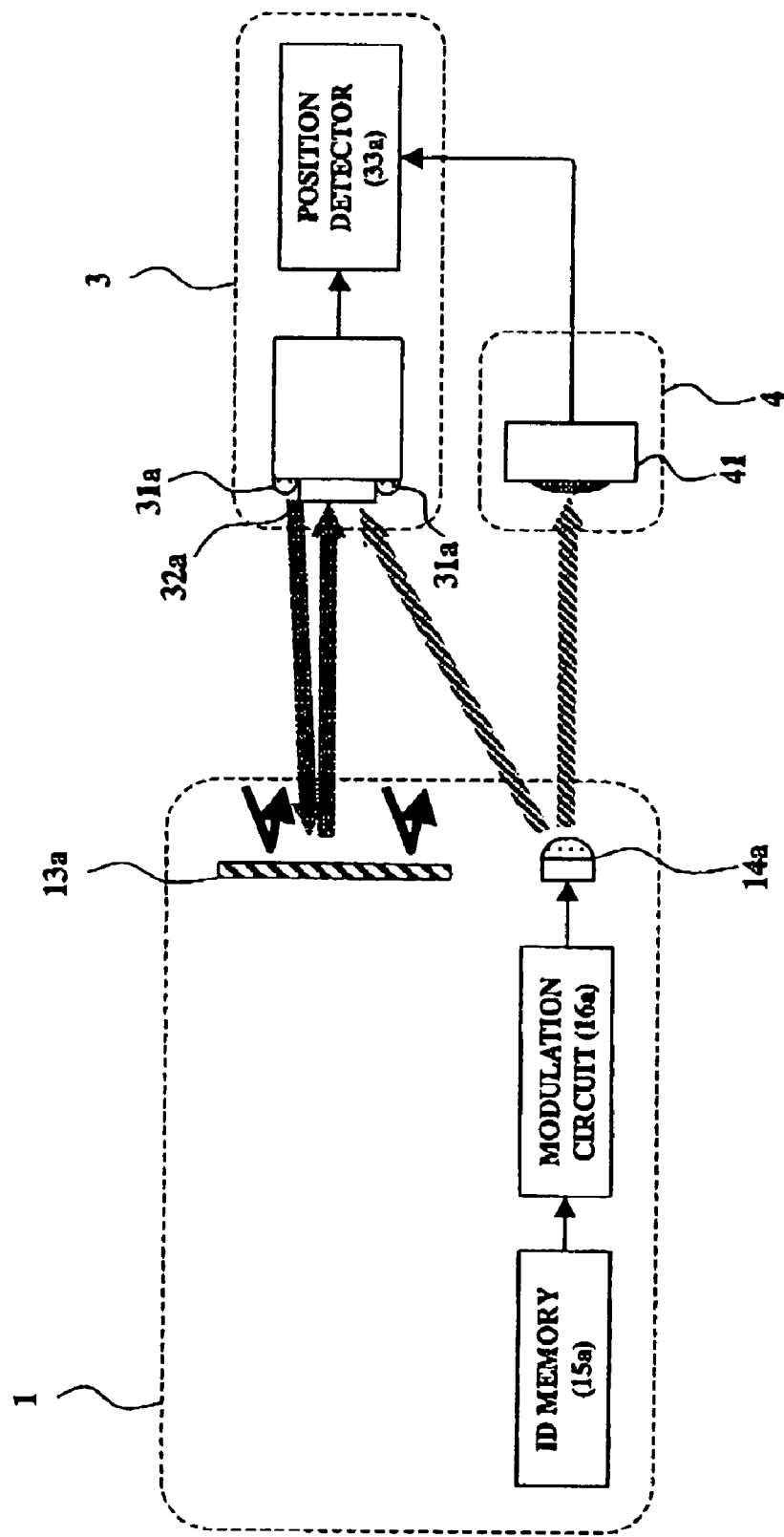
FIG. 2 is a schematic construction diagram showing an embodiment of the invention of this application.
Figure 3:
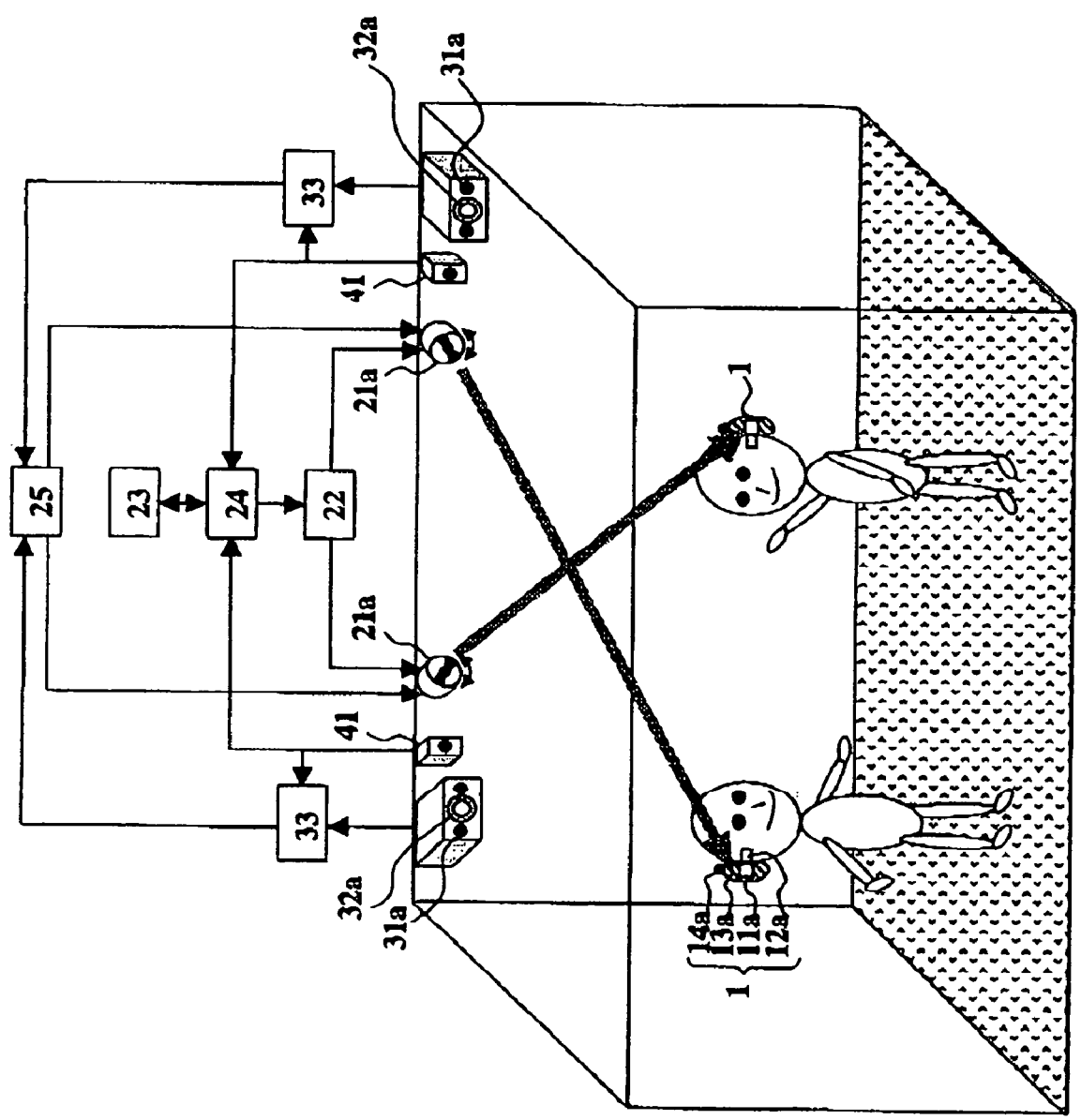
FIG. 3 is another schematic construction diagram showing the embodiment of the invention of this application.

FIGS. 2 and 3 show an embodiment of the invention of this application. A battery-less terminal (1) is equipped further with an infrared beacon (14a) serving as an infrared light source (14) of infrared light for ID, an ID memory (15a) serving as an ID memory means (15) and a modulator circuit (16a) serving as a modulation means (16). In the environment side, there is provided an ID detection device (4) equipped with an infrared sensor (41).

First of all, in the battery-less terminal (1), infrared light for ID modulated by the modulator circuit (16a) in accordance with the ID data stored in the ID memory (15a) is intermittently emitted from the infrared beacon (14a) at predetermined time intervals. The infrared beacon (14a) may be an infrared LED. The infrared light for ID reaches two different sensors, that is, the infrared sensor (41) of the ID detection device (4) and the infrared camera (32a) of the position detection device (3), through different paths as shown in FIG. 2. The infrared sensor (41) receives and demodulates the modulated infrared light for ID and extracts the ID bit array therefrom. In the infrared camera (32a), the infrared light for ID is captured as a luminescent spot, and, based on the image, its position relative to the camera is detected from the frame coordinates by the position detector (33a) which performs image processing. Here, since the beacon light emission is repeated at the predetermined time intervals, the output timing can be identified from the change in the luminescent spot. In other words, the output of the infrared sensor (41) and the camera image by the infrared camera (32a) can be synchronized.

On the other hand, in the position detection device (3), infrared light for position is always emitted from the infrared LED (31a). Thus, when the battery-less terminal (1) enters into the range of emission and is directed toward the emission, the infrared light for position is reflected by the retroreflective sheet (13a) substantially parallel to the incident direction. The infrared light for position reflected from the retroreflective sheet (13a) is retroreflected to the infrared camera (32a) disposed near the infrared LED (31a). The retroreflective sheet (13a) may include multiple recurrent corner cubes in a sheet shape. In the infrared camera (32a), the infrared light for position is imaged as a luminescent spot through a visible light cut filter, and, based on the image, the camera relative position is detected from the frame coordinates by the position detector (33a) performing the image processing. Since the infrared light for position, that is, the luminescent spot of the retroreflective sheet (13a), is not lost easily, unlike the infrared light of the infrared beacon (14a) used for ID, the position of the battery-less terminal (1) can be traced at all times. Thus, when the luminescent spot of the infrared beacon (14a) appears near the luminescent spot of the retroreflective sheet (13a), the ID data obtained by the infrared sensor (41) can be mapped to the retroreflective sheet (13a).

Accordingly, the intermittently detected ID information and position information can be correlated while continuously tracing a user wearing the battery-less terminal (1), and a separate information support can be provided to the user. Furthermore, distribution of the load upon devices can be achieved by performing the ID detection as time-series processing using the infrared sensor (41) and performing position detection through image processing using the infrared camera (32a). Therefore, this processing can be achieved with a lower load than that of the case that both of them are detected only with a camera.

Figure 4:
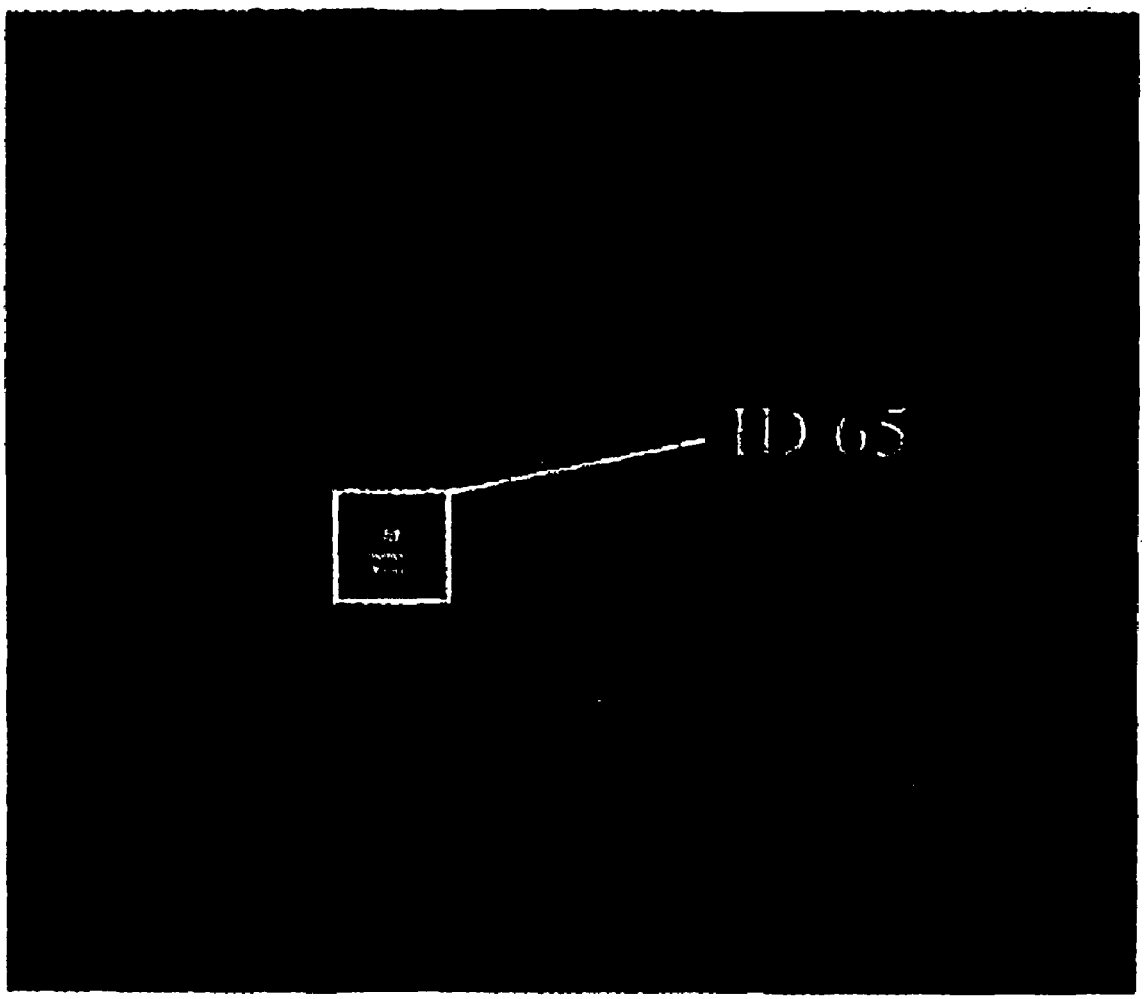
FIG. 4 is a diagram showing an example of an image by an infrared camera.

FIG. 4 shows an example in which an ID received by the infrared sensor (41) is mapped to the positions of the luminescent spot (that is, the lower, slightly larger luminescent spot within the white frame, which appears in a sheet form) of the infrared light for position from the retroreflective sheet (13a) and the luminescent spot (that is, the upper, smaller round luminescent spot within the white frame, which has the form of the LED beacon) of infrared light for ID from the infrared beacon (14a) on the image by the infrared camera (32a). In this case, the fact that the battery-less terminal (1) with the ID number 65 is at the detected position has been detected.

Here, in the imaging and locating of infrared light for ID from the infrared beacon (14a) by the infrared camera (32a), the camera can detect a beacon as a luminescent spot if the carrier frequency of the beacon is sufficiently high relative to the frame frequency of the camera and if one sequence of the beacon flashes sufficiently long relative to the frame time of the camera. On the other hand, the reflected light from the reflective sheet can be detected independently of the frame frequency and time since the reflected light is continuous light, and the bigger luminescent spot near the beacon is the one from the reflective sheet. The approximate distance between the infrared camera (32a) and the battery-less terminal (1) can be calculated based on the size of the luminescent spot from the reflective sheet. Thus, the position of the beacon can be detected by applying a distortion correction of the camera lens to the image.

For example, the frame time is about 33 milliseconds where the frame frequency of the camera is 30 Hz (30 fps). The beacon can be imaged in a stable manner if its sequence time is at least double, that is, 66 milliseconds.

Further, in the sensing of the infrared light for ID from the infrared beacon (14a) by the infrared sensor (41), the ID of a beacon is first pulse-modulated by PPM (Pulse Phase Modulation), PWM (Pulse Width Modulation) and such, and the result is transmitted by infrared light over a carrier wave at 38 kHz, for example. In this case, the sensor extracts the pulse from the carrier wave, demodulates the pulse based on the timing of the pulse, and extracts the hit array which is the ID. Accordingly, ID can be detected.

However, only one beacon can be received at one time since the infrared sensor (41) is a single photoreceptor. If multiple beacons are emitted simultaneously, they will collide each other, causing their waveforms mixed, and an error in the carrier wave serving as the physical layer or in the upper layer to which the modulation is applied will occur and thus the demodulation cannot be performed. Therefore, although a wrong ID will not be detected even when the collision occurs, none of the beacons collided can be properly received. However, the sensor side can detect the collision. Accordingly, an ID can be detected accurately with a probability depending on the number of users, which is the number of terminals, by making the time intervals of the intermittent light emission random, that is, randomizing the output timing of the beacons.

For example, when the beacon outputs of two of the battery-less terminals (1) are synchronized and their beams come into collision, a wrong ID is not detected since the sensor can detect the collision. Because the next beacon outputs are random, the probability of the synchronization of the next transmissions is extremely low if the interval time is sufficiently long with respect to the sequence time of the beacons. Therefore, by keeping the average interval time between beacon outputs sufficiently long with respect to the sequence times of beacons in consideration of the number of terminals, each ID can be accurately detected after the interval time. After the ID is detected, the terminal with that ID can be traced as long as the luminescent spot of the reflective sheet is not lost by the camera, and thus the subsequent collisions can be ignored. Therefore, even when multiple users enter into one area and infrared light for ID from the respective battery-less terminals (1) are synchronized, the ID information and position information of each of the users can be correlated accurately.

Figure 5:
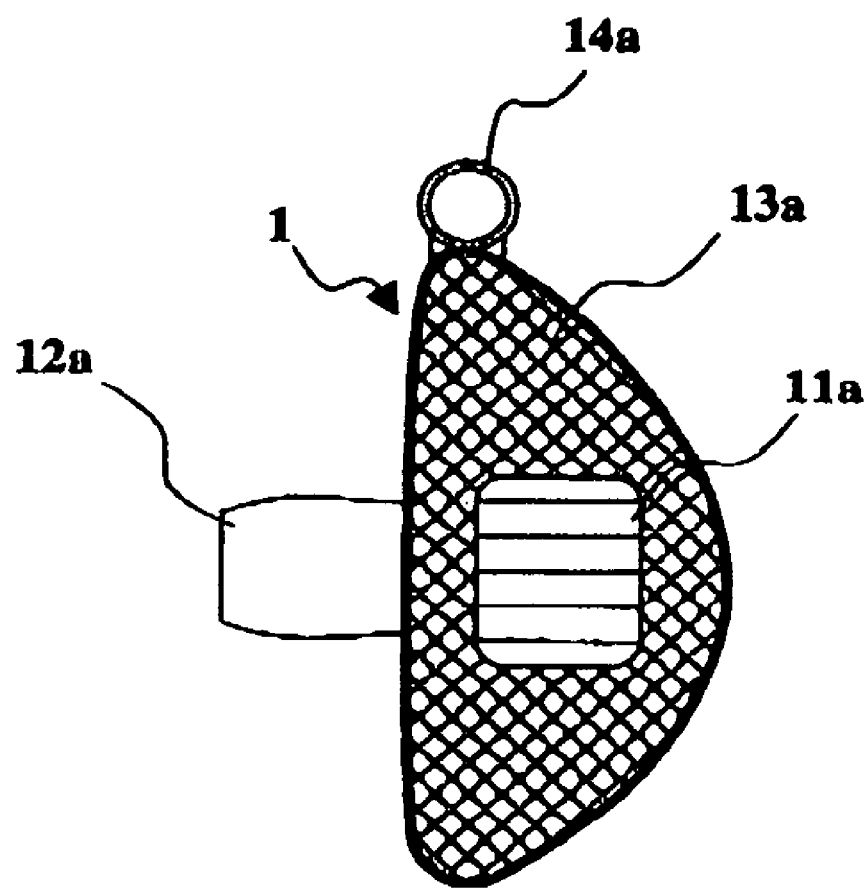
FIG. 5 is a schematic appearance diagram showing an example of implementation of an infrared light source to a battery-less terminal.
Figure 10:
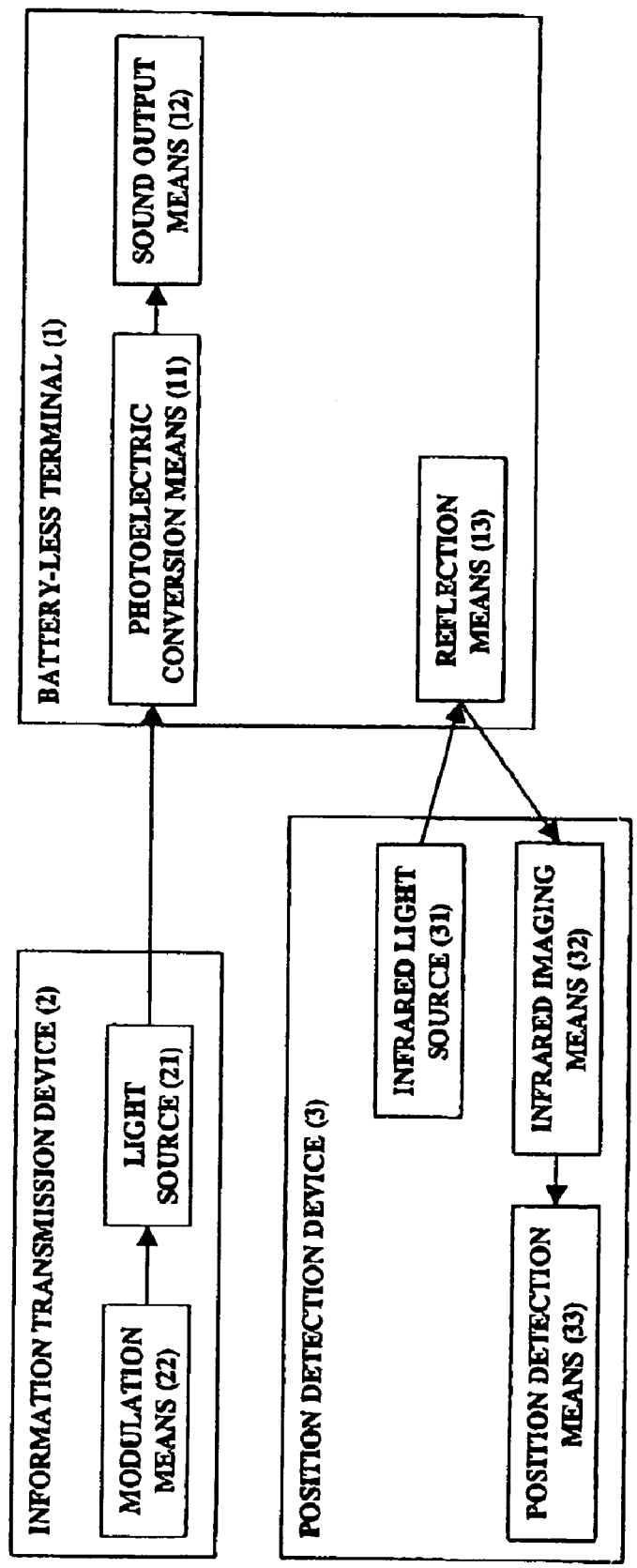
FIG. 10 is another functional block diagram for explaining the conventional information support system.
Figure 11:
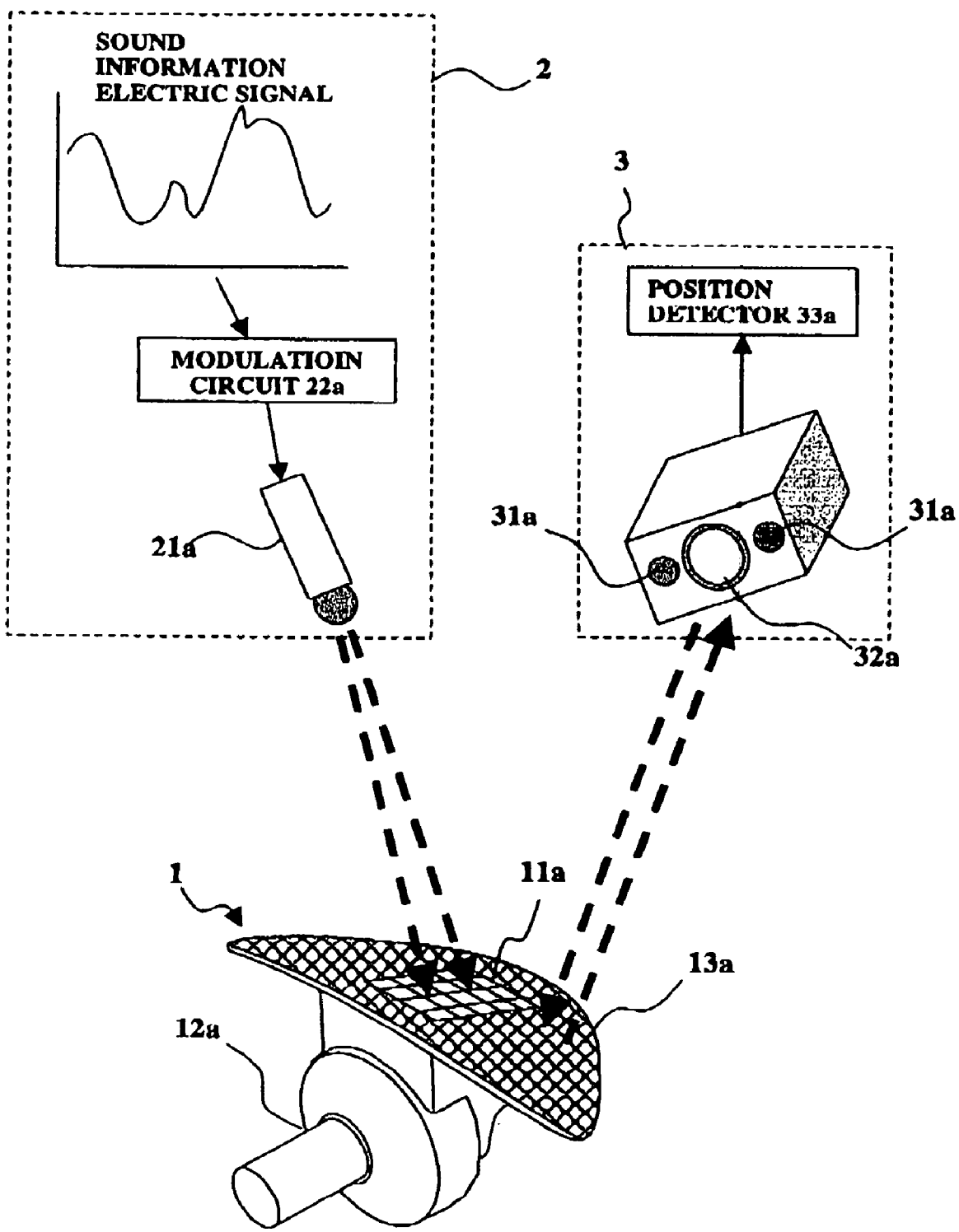
FIG. 11 is a simplified view diagram showing a specific example of the conventional information support system.
Figure 12:
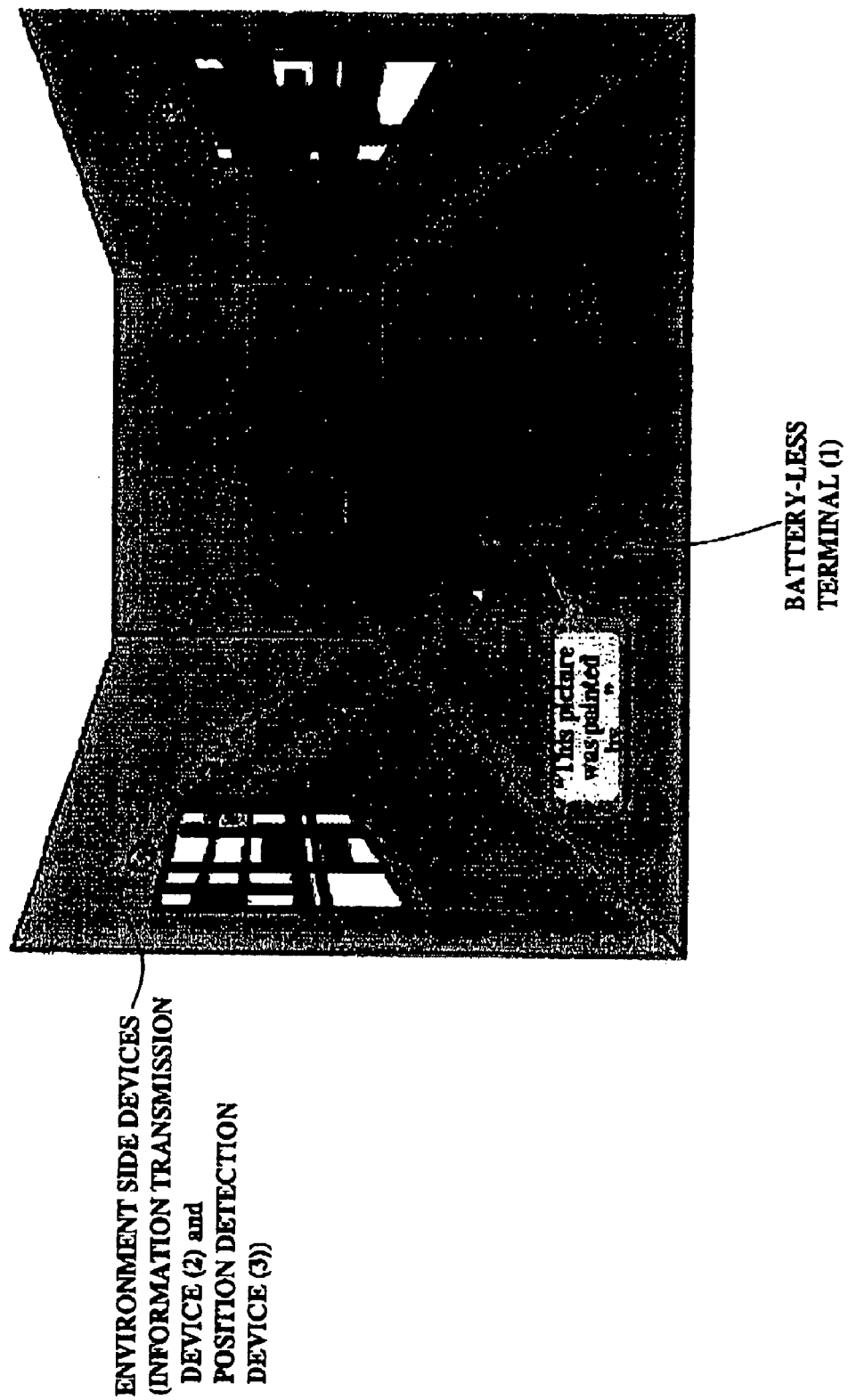
FIG. 12 is a simplified view diagram showing an application example of the conventional information support system.

FIG. 5 shows an example in which the infrared beacon (14a) is implemented on the battery-less terminal (1). In this example, the infrared beacon (14a) comprising an infrared LED is attached to the earphone type battery-less terminal (1) shown in FIG. 10. An integrated circuit, not shown, including an ID memory and a modulator circuit is further attached thereto. Of course, the battery-less terminal (1) may have other various forms such as ear-hook type, head-phone type or card type, and the infrared beacon (14a) may be attached to an appropriate position in each case.

A button cell (not shown) may be attached to the terminal and its power may be used for driving the infrared beacon (14a). On the other hand, the infrared beacon (14a) can be driven only by an energy provided from the environment side through the solar cell (11a). More specifically, as described above, the alternating current component caused by the solar cell (11a) is used, rather than the direct-current component generated simultaneously, for outputting the electric signal as sound from the earphone (12a), which the solar cell (11a) has photoelectric-converted from the sound information optical signal received from the information transmission device (2). Thus, by using the direct-current component for driving the beacon, the terminal can be battery-less, requiring no power source. Of course, storage means such as a secondary cell for storing the direct-current component may be provided therein.

Consequently, a small terminal having good mobility and attachability like the conventional one can be achieved even when the battery-less terminal (1) is additionally equipped with the infrared beacon (14a) and the integrated circuit.

Since the infrared light source (14) such as the above infrared beacon (14a) is used for ID transmission, an ID can be transmitted/detected stably even from a distance as far away as several meters. Thus, a user only needs to enter into an exhibition booth, for example, with the small and light battery-less terminal (1) capable of transmitting the beacon, so that the ID can be automatically transmitted to the system without any action by the user. As a result, personal information support can be obtained in an extremely easy way.

By the way, as described above, when the infrared light for ID from the infrared light source (14) is captured by using the infrared camera (32a), which is a typical example of the infrared imaging means (32), the stable imaging is difficult if the infrared light is shorter than a frame time of about 33 milliseconds since the frame frequency of the general camera is 30 fps. On the other hand, with the infrared sensor (41), the detection rate is increased as the length of the received infrared light decreases. Since the ID detection is an essential part of the present information support system, the detection rate by the infrared sensor (41) is preferably kept as high as possible.

Therefore, in order to satisfy both of these requirements, after a predetermined period of time from the emission of the infrared light for ID by the infrared light source (14) of the battery-less terminal (1), different infrared light may be emitted as infrared light for imaging.

Figure 6:
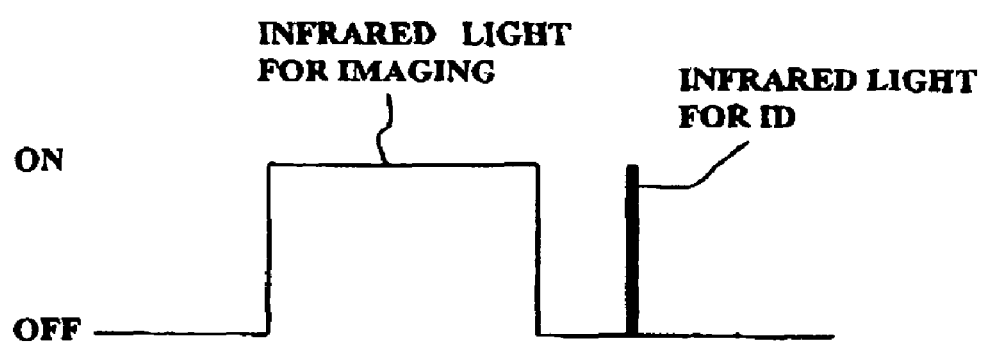
FIGS. 6(a), 6(b) and 6(c) are diagrams illustrating light-emission timings of infrared light for ID and infrared light for imaging from the infrared light source of the battery-less terminal.
Figure 6:
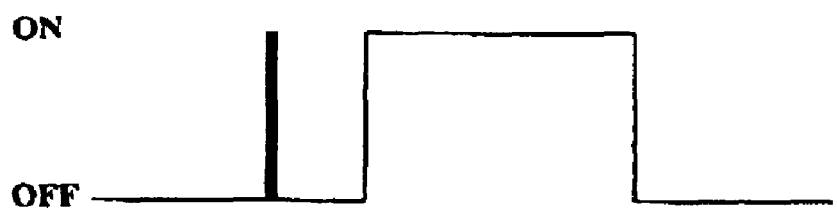
Figure 6:
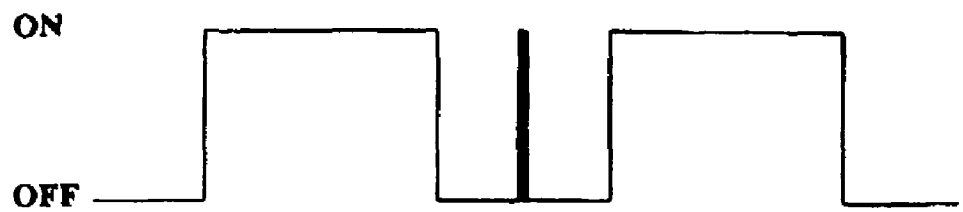

More specifically, as illustrated in FIG. 6 for example, the timing of the light emission by the infrared light source (14) is controlled so that the infrared light for imaging is emitted at a predetermined time immediately before (FIG. 6(a)), or immediately after (FIG. 6(b)), or immediately before and after (FIG. 6(c)) the emission of the infrared light for ID. This control is performed by a control circuit (not shown) built in the integrated circuit. Of course, the infrared light for ID is sufficiently short to be suited to the infrared sensor (41), and the infrared light for imaging is sufficiently long to be suited to the infrared camera (32a). Thus, the ID detection rate by the infrared sensor (41) can be kept high, and at the same time, the imaging by the infrared camera (32a) can be performed stably.

In addition, a light transmission rate changing means may be provided on a reflected light path of the reflection means (13) such as the retroreflective sheet (13a) (or in front of the reflective plane if the means is of sheet-type). The light transmission rate changing means changes the reflectivity of infrared light for position from the infrared light source (31) of the position detection device (3).

More specifically, the light transmission rate changing means may be a liquid crystal shutter, for example, which can be provided on the optical path (or in front of the reflective plane) for changing the light transmission rate in synchronization with the emission of the infrared light for ID. In other words, the light transmission rate is changed to substantially zero or reduced to half upon the emission and then is controlled to be sufficiently high before the next light-emitting time. This control may be performed by the control circuit (not shown) built in the integrated circuit. Thus, even the short infrared light for ID can be detected by the infrared sensor (41) with high precision without being hindered by the infrared light for positioning from the position detection device (3).

Figure 1:
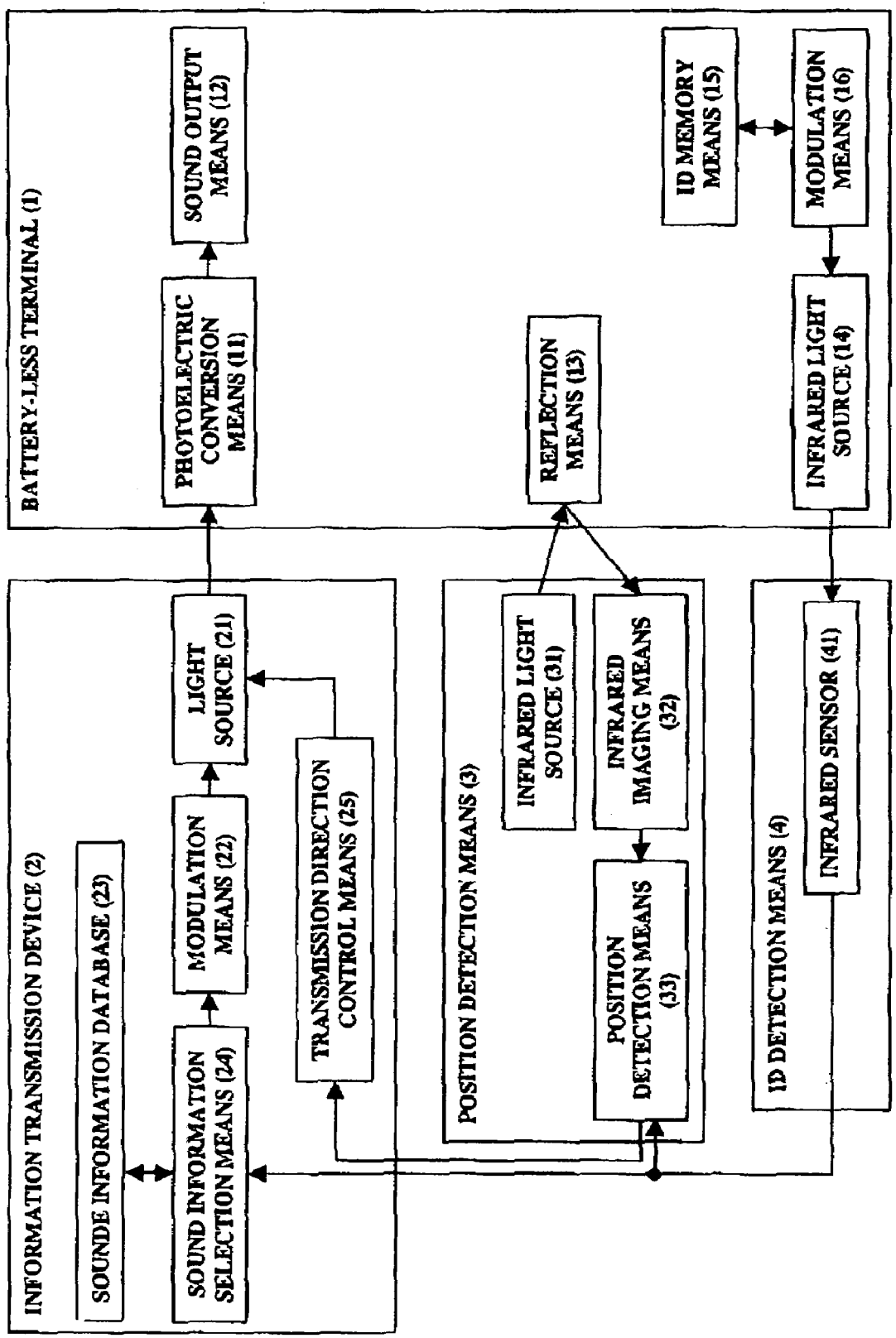
FIG. 1 is a functional block diagram for explaining the invention of this application.

Finally, as illustrated in FIG. 1, the information transmission device (2) may include a sound information database (23) storing sound information corresponding to predetermined ID data, and a sound information selection means (24) for selecting, from the sound information database (23), sound information corresponding to ID data output by the infrared sensor (41) of the ID detection device (4). In this case, as described above, the position information and ID information of a user are detected and correlated to each other, and the ID data output by the infrared sensor (41) of the ID detection means (4) is transmitted to the sound information selection means (24). The sound information based on the ID data is searched, selected and retrieved from the sound information database (23), and the sound information is transmitted as an optical signal through the modulation means (22) and light source (21) as described above. Thus, personal information support can be achieved, sending only the information corresponding to the user with that particular ID.

Furthermore, as illustrated in FIG. 1, the information transmission device (2) may further include a transmission direction control means (25) for directing the transmission of the optical signal toward the position of the battery-less terminal (1) which is detected by the position detection means (33) of the position detection device (3). In this case, a sound information optical signal corresponding to the ID data is transmitted only to the user at the detected position with pinpoint accuracy, and more superior personal information support can be provided. This direction control can be achieved by, for example, panning and tilting the light source (21) (LED (21a)) with the transmission direction control means (25) also as illustrated in FIG. 3.

In order to drive the infrared beacon (14a), the battery-less terminal (1) may use, as the drive source, the direct-current component generated by the solar cell (11a), which is conventionally not used, may have a storage means (such as a secondary cell) or may use a button cell, for example. Also, such power supply may function as a drive source for the integrated circuit including the ID memory (15a) and the modulator circuit (16a). Therefore, the terminal can be battery-less, not requiring any extra external power supply, and thus can be small and light.

Figure 7:
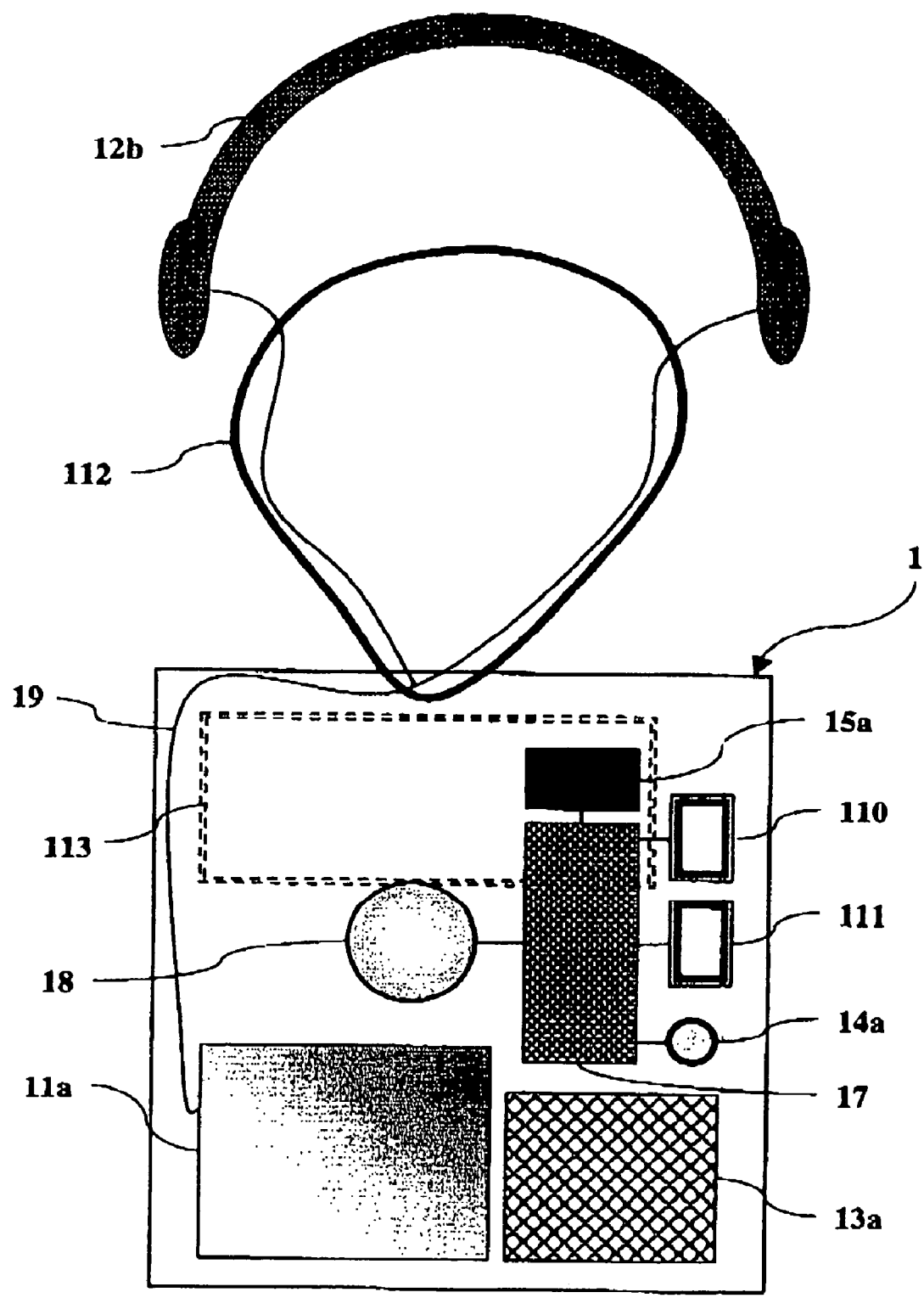
FIG. 7 is a schematic construction diagram showing another embodiment of the invention of this application.
Figure 8:
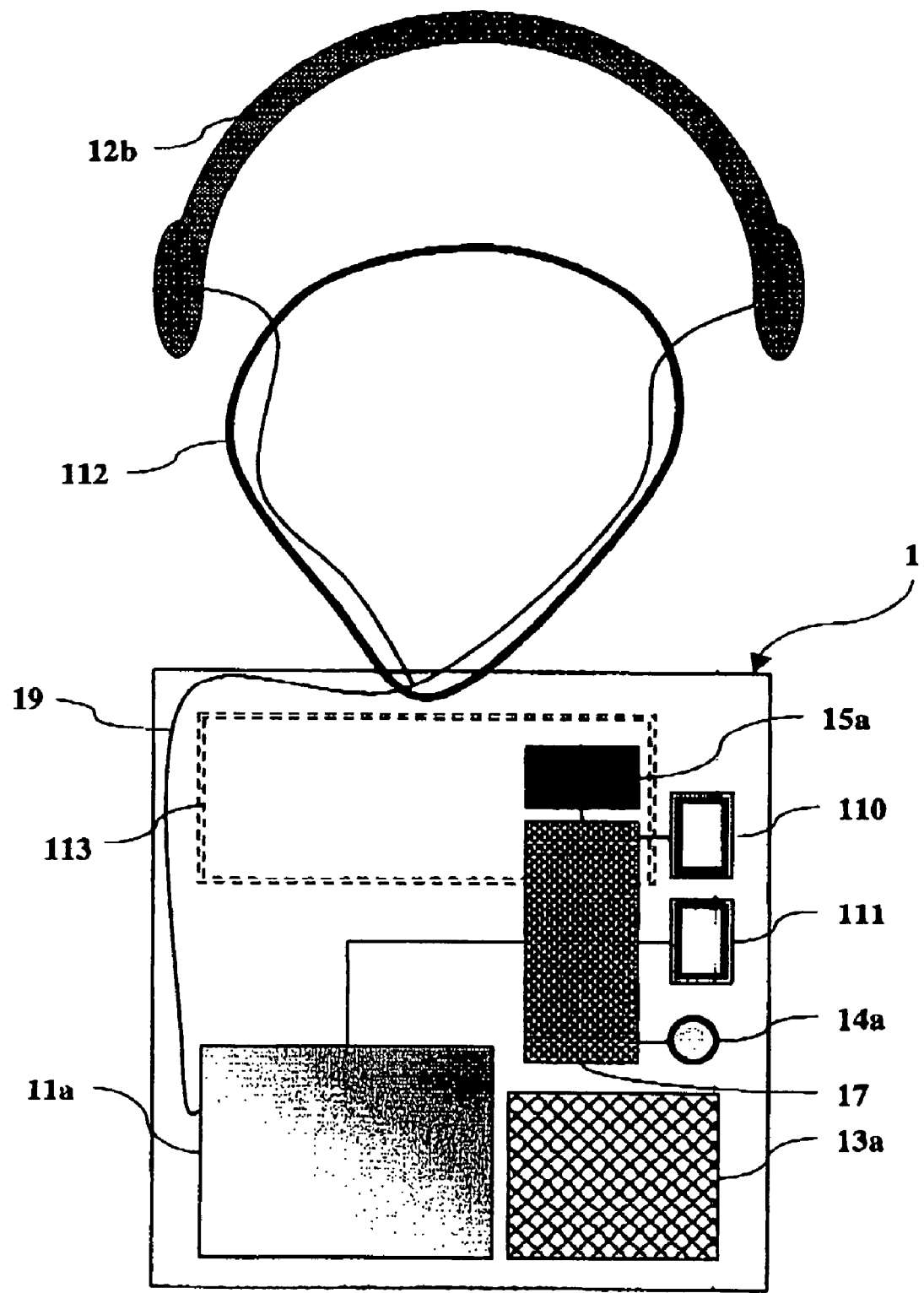
FIG. 8 is a schematic construction diagram showing still another embodiment of the invention of this application.
Figure 9:
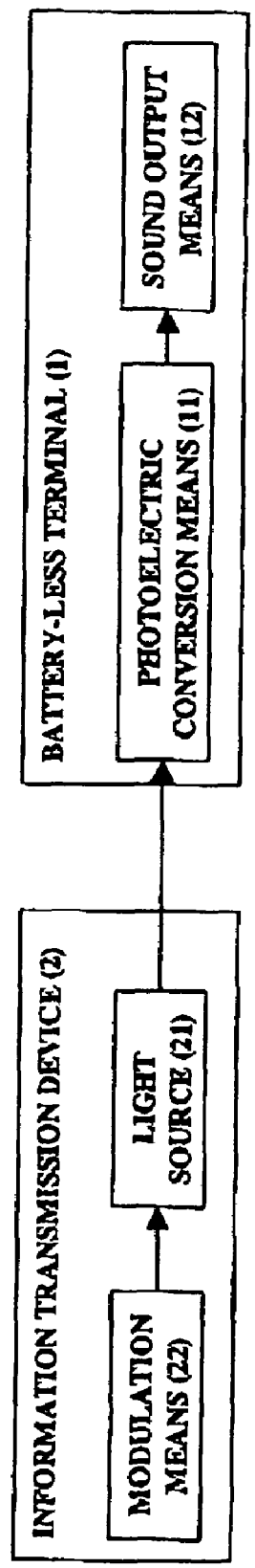
FIG. 9 is a functional block diagram for explaining a conventional information support system.

In order to allow the detection of position information and ID information of the battery-less terminal (1) by the environment side as described above and also to allow the user to receive sound information through the battery-less terminal (1) and inform the environment side of his/her simple decisions such as Yes/No, another embodiment may be provided in which the battery-less terminal (1) further includes answer buttons (110) and (111) driven by the above internal power supply and utilized with the infrared beacon (14a) and integrated circuit as illustrated in FIGS. 7 and 8.

More specifically, in the embodiment shown in FIG. 7, the battery-less terminal (1) itself has a card-shape and includes the solar cell (11a), head phone (12b), retroreflective sheet (13a), infrared beacon (14a), ID memory (15a), CPU (17) which performs modulation processing and other operations, a button cell (18) functioning as a power supply and a wire (19) that conducts an electric signal photoelectrically generated by the solar cell (11a) to the head phone (12b). Furthermore, the battery-less terminal (1) includes an answer button (110) for transmitting one information and an answer button (111) for transmitting another one information. The card-shaped battery-less terminal (1) can be carried by a user with a neck strap (112), for example.

When a user obtains and listens to sound information from the environment side as described above and the sound information includes inquiry information (such as a selection inquiry about "Would you like to hear next voice guide?") requesting a user's decision, the user may press or touch the answer button (110) or (111) (one corresponding to "YES" and the other corresponding to "NO") in order to answer the inquiry ("YES" or "NO", for example), thus making a command.

In the battery-less terminal (1), answer information corresponding to the answer buttons (110) and (111) is prestored in the ID memory (15a) or another memory. The CPU (17) retrieves the answer information predefined for the response button (110) or (111) used by the user and controls the emission of the infrared beacon (14a) in correspondence with the retrieved answer information. Since the infrared beacon (14a) emits infrared light for ID modulated in accordance with ID data as described above, the answer signal may be superimposed on the emitted light. For example, when the ID is pulse-modulated and is transmitted over a carrier wave of infrared light, the answer signal can be pulse-modulated separately and transmitted over a carrier wave at a different frequency.

In the environment side, the above infrared sensor (41) or another infrared sensor exclusive for the infrared light answers receives and demodulates the infrared light and extracts the answer signal.

Subsequently, the sound information to be transmitted may be changed in accordance with the extracted answer signal so that the user can receive the sound information in accordance with his/her command. Here, as described above, since the apparatus in the environment side detects the position information and ID information of the battery-less terminal (1) which has transmitted the answer signal, interactive personal support with pinpoint accuracy can be achieved based thereon.

Furthermore, by transmitting an answer information rewrite signal to the CPU or memory along with the sound information from the apparatus in the environment side, the answer information to be transmitted by operating the answer button (110) or (111) can be changed for each inquiry signal. This achieves information support with more interactivity.

While the button cell (18) is used as a drive power supply in FIG. 7, the direct-current component of the power generated by the directly connected solar cell (11a) may be used as shown in FIG. 8. Alternatively, the direct-current component may be stored in a secondary cell and the stored power may be used.

While FIGS. 7 and 8 include the two answer buttons (110) and (111), one or two or more buttons may be provided. However, the minimum means to achieve simple communication of a decision by a user is here intended, and many buttons complicate the construction excessively and consume much power. Thus, one or two, or several buttons are preferably. Of course, the invention is not limited to this quantity of the buttons.

In FIGS. 7 and 8, the battery-less terminal (1) is configured in a card shape to be used also as a card such as a staff card, pass card, membership card and ID card for various situations such as an event site. In other words, a card-shaped object may be used as the battery-less terminal (1) by providing the above-descrived components therein. (113) in FIGS. 7 and 8 refers to an ID indicator such as a business card of a user on the surface. Many existing information apparatuses are used separately from the objects held or worn by the user, and to the contrary, the battery-less terminal (1) according to the invention of this application may be integrated with an earphone or a card and thereby causes no pressure of using a new information apparatus to the user and realizes a highly operable and easy-to-enter ubiquitous interactive information space. For example, when this is used in a various event space, event support for each person can be provided easily.

Of course, the invention of this application is not limited to the embodiments, and the details may have various forms.

INDUSTRIAL APPLICABILITY

As described above in detail, with an information support system of the invention of this application, not only position information but also ID information of a user terminal can be detected simultaneously, and separate information support can be provided to each user based on the detection results. Thus, better interactive support between the user and the environment side can be achieved.

The invention claimed is:

1. An information support system characterized by comprising an information transmission device for transmitting sound information to a battery-less terminal, a position detection device for detecting position information of the battery-less terminal and an ID detection device for detecting personal identification information of the battery-less terminal, wherein the battery-less terminal has photoelectric conversion means for receiving and converting an optical signal, which is strength-modulated and transmitted by the information transmission device, to an electric signal, sound output means for outputting the electric signal, which is converted by the photoelectric conversion means, as sound, reflection means for reflecting infrared light for position emitted by the position detection device, an infrared light source of infrared light for ID, ID memory means for storing ID data, and modulation means for modulating infrared light for ID in accordance with the ID data;

the information transmission device has a light source for an optical signal and modulation means for modulating the strength of the optical signal in accordance with an electric signal of sound information to be transmitted;

the position detection device has an infrared light source of infrared light for position, infrared imaging means for capturing infrared light for position which is reflected and returned by the battery-less terminal, and position detection means for detecting the position of the battery-less terminal based on the infrared light for position captured by the infrared imaging means; and the ID detection device has an infrared sensor for receiving infrared light for ID which has been modulated and emitted by the battery-less terminal and for outputting the ID data.

2. The information support system according to claim 1, characterized in that the infrared imaging means of the position detection device captures the infrared light for ID which has been modulated and emitted by the battery-less terminal, and the position detection means of the position detection device further detects the position of the battery-less terminal in the infrared image for ID which has been captured by the infrared imaging means.

3. The information support system according to claim 1, characterized in that the infrared light source in the battery-less terminal emits the infrared light for ID intermittently.

4. The information support system according to claim 3, characterized in that the time intervals of the intermittent light emission are random.

5. The information support system according to claim 1, characterized in that the infrared light source of the battery-less terminal emits different infrared light for imaging with a predetermined time gap from the emission of the infrared light for ID.

6. The terminal detection system according to claim 5, characterized in that the infrared light source of the battery-less terminal emits the infrared light for imaging with a predetermined time gap before, or after, or before and after the emission of the infrared light for ID.

7. The information support system according to claim 1, characterized in that light transmittance changing means is provided on the reflected light path formed by the reflection means of the battery-less terminal, wherein the change in light transmittance by the light transmittance changing means is synchronized with the emission of the infrared light for ID by the infrared light source.

8. The information support system according to claim 1, characterized in that the information transmission device further has a sound information database storing sound information corresponding to predetermined ID data and sound information selection means for selecting from the sound information database sound information corresponding to the ID data outputted from the infrared sensor of the ID detection device, wherein an optical signal whose strength is modulated in accordance with the electric signals of the sound information selected by the sound information selection means is transmitted.

9. The information support system according to claim 1, further characterized in that the information transmission device has transmission direction control means for directing the emission of an optical signal toward the position of the battery-less terminal detected by the position detection means of the position detection device.

* * * * *